United States Patent [19]

Mizushima

[11] 4,193,095
[45] Mar. 11, 1980

[54] DRIVER SYSTEM OF MEMORY TYPE GRAY-SCALE DISPLAY PANEL

[75] Inventor: Masashi Mizushima, Hachioji, Japan

[73] Assignee: Hitachi, Ltd., Japan

[21] Appl. No.: 875,798

[22] Filed: Feb. 7, 1978

[30] Foreign Application Priority Data

Feb. 25, 1977 [JP] Japan .................................. 52-19245

[51] Int. Cl.² ............................................. H04N 5/70
[52] U.S. Cl. .................................... 358/241; 340/793; 340/802; 340/781; 365/111
[58] Field of Search ................... 340/324 M; 358/240, 358/241

[56] References Cited

U.S. PATENT DOCUMENTS

| 3,627,924 | 12/1971 | Fleming et al. | 358/241 |
| 3,740,570 | 6/1973 | Kaelin et al. | 358/241 X |
| 3,761,617 | 9/1973 | Tsuchiya et al. | 358/241 |

*Primary Examiner*—Robert L. Richardson
*Attorney, Agent, or Firm*—Craig and Antonelli

[57] ABSTRACT

A driver system of a display panel including a matrix of luminescent elements with a bi-stable operation condition comprises a circuit arrangement for combining a plurality of divided lighting periods to provide a gray-scale display and a circuit arrangement for increasing or decreasing the respective widths of the divided lighting periods in correlation with each other, whereby a control of luminance with gray-scale is provided.

13 Claims, 9 Drawing Figures

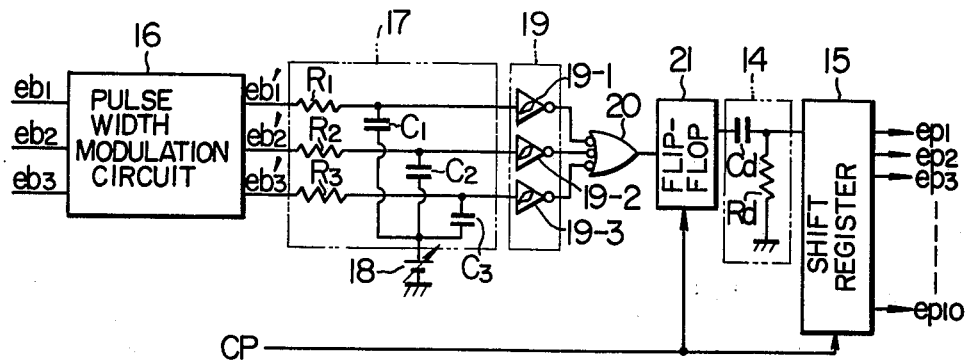
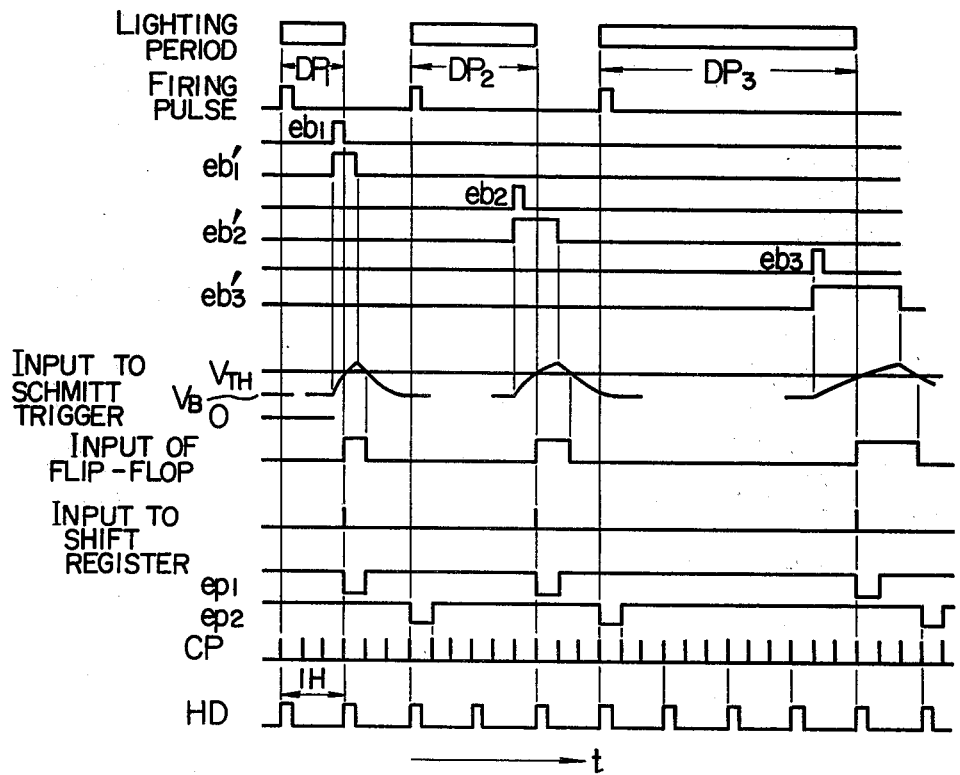

DRIVER SYSTEM OF MEMORY TYPE GRAY-SCALE DISPLAY PANEL

The present invention relates to a driver system of a display panel including a matrix of luminescent elements each of which has a memory function or bi-stable operation condition, and more particularly to means for controlling a gray-scale luminance in such a display panel.

Planar display panels have usually been used for displaying characters, numerals, symbols, graphs or gray-scale images. A so-called memory type display panel among such planar display panels which includes luminescent elements each having a memory function or bi-stable operation condition of lighting and non-lighting states, has advantages in that a high luminance can be obtained and the memory or storage capacity required for the system can be greatly reduced when the panel is used as an image output terminal of an electronic computer or the like. In the case where it is desired to display a gray-scale image such as a television picture image on the memory type display panel, the luminance level of display image must be changed in dependence upon the surrounding brightness level. In addition, a color display requires the control of the respective luminance of red, green and blue luminescent elements for providing a white balance of display image. In this connection, one conventional method of the obtaining a desired luminance level comprises controlling the amplitude of voltage or current applied to a luminescent element. However, since a voltage or current range of the luminescent element exhibiting a memory function is not sufficiently wide in comparison with the width of the variation in voltage or current required for the luminance level adjustment, a stable operation of the luminescent element has not been attained in such systems.

Another method of obtaining a desired luminance level comprises adjusting the amplitude of a video signal when it is in analog form. But, this method reduces the number of gray-scales which can be displayed.

Accordingly, an object of the present invention is to provide a driver system of a memory type display panel, in which a reproduction image substantially conformable to an original image can be displayed at an optimum luminance level in dependence upon the surrounding brightness level while eliminating the above-described drawbacks of the prior art systems.

Another object of the present invention is to provide a driver system of a memory type color display panel, in which a display luminance and a white balance of display image are adjustable or controllable.

According to the present invention, there is provided a driver system of a display panel including a matrix of luminescent elements each having a bi-stable operation condition, in which a gray-scale luminance is provided to the display panel by the combination of a plurality of divided lighting periods, wherein said system comprises circuit means for increasing or decreasing the respective widths of the divided lighting periods in correlation with each other to control the gray-scale luminance of the display panel.

As means for providing the gray-scale luminance to the display panel, the present invention employs a technique called "time-modulation within a field" as disclosed in Japanese Patent Application Laid-Open No. 31094/73 entitled "Planar Gray-Scale Display Device" and assigned to the assignee of this application, in accordance with which a memory can be constructed with small storage capacity and a rapid response of the luminescent element is not required. This technique is also disclosed in the article of A. Sasaki et al entitled "Display-Device Research and Development in Japan", IEEE Transactions on Electron Devices, Vol. ED-20, No. 11, November 1973, pp. 925-933.

The present invention itself as well as the above and other objects and features will be better understood when reading the following description in conjunction with the accompanying drawings, in which:

FIG. 6 shows an arrangement of a luminance control or adjustment circuit according to a first embodiment of the present invention;

FIG. 7 shows a timing chart of various signals in the circuit of FIG. 6;

For better understanding of the present invention, the construction and operation of a driver system of memory type planar display panel using the time-modulation technique within a field, to which the present invention may be applied, will be first explained referring FIGS. 1 to 4 and in connection with the principle of a display with gray-scale luminance as well as the prior art arrangement.

Figure 1:
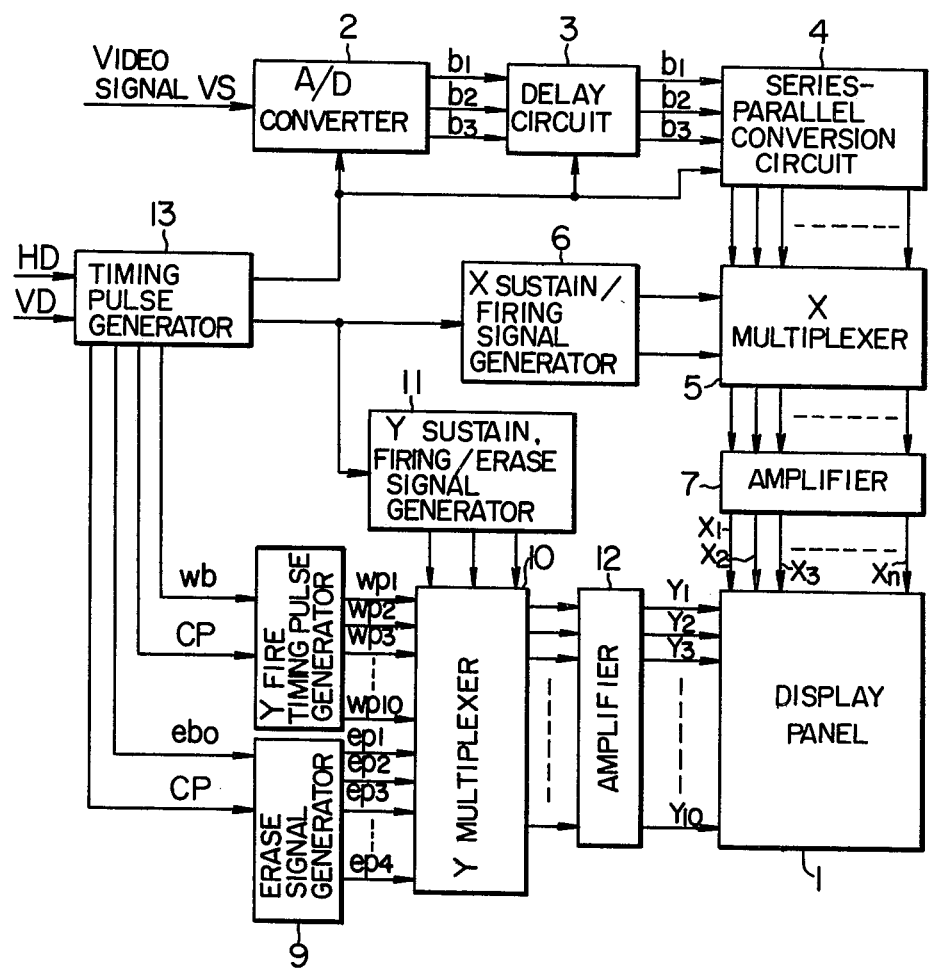
FIG. 1 is a block diagram showing the main components of a driver system of a memory type display panel for a gray-scale display, to which the present invention may be applied.

FIG. 1 shows in block diagram the main components of a driver system for displaying a television picture image on a memory type display panel, to which the present invention may be applied. The display of television picture image usually requires about 300,000 (900,000 for color display) luminescent elements and 6 to 7 bits of gray-scale levels for a video signal. For convenience of description and illustration, a memory type display panel 1 has 10 horizontal electrodes $Y_1$-$Y_{10}$, n vertical electrodes $X_1$-$X_n$ and a matrix of 10×n luminescent elements connected therewith and a video signal is converted to a 3-bit coded signal.

A video input signal VS is converted to a 3-bit ($b_1$, $b_2$, $b_3$) coded video signal by an A/D converter circuit 2 and the coded video signal is applied through a delay circuit 3 to a series to parallel conversion circuit 4 which is mainly formed by shift registers and OR circuits and in which the time-sequentially arranged 3-bit signal is converted to n parallel outputs. These n parallel outputs are supplied to an X multiplexer 5 to switch signals from an X sustain and firing signal generator circuit 6. The outputs of the X multiplexer 5 are supplied through an amplifier 7 to the vertical electrodes $X_1$-$X_n$ of the display panel 1.

Signals from a Y sustain, firing and erase signal generator circuit 11 are switched in a Y multiplexer 10 by firing signals $w_{p1}-w_{p10}$ from a Y fire timing pulse generator circuit 8 and erase signals $e_{p1}-e_{p10}$ from an erase signal generator circuit 9. The outputs of the Y multiplexer 10 are supplied through an amplifier 12 to the horizontal electrodes $Y_1-Y_{10}$ of the display panel 1.

A timing pulse generator circuit generally shown by a block 13 in FIG. 1 receives horizontal and vertical sync signals HD and VD included in the video signal and generates a clock signal CP for the system, a fire timing signal wb and an erase timing signal $eb_0$. Further explanation of the timing pulse generator circuit 13 is omitted since it is disclosed in the above-mentioned Japanese Patent Application Laid-Open No. 31094/73. With respect to the other circuit arrangements shown in FIG. 1, one can also refer to this Japanese Laid-Open Application.

When a firing pulse is applied between selected X and Y electrodes, the associated luminescent element in the display panel 1 starts to emit light and the lighting continues until an erase pulse is applied to the Y electrode. A gray-scale luminance of a display image thus formed by the lighting or nonlighting of the respective luminescent elements is provided by controlling a lighting period of each luminescent element as defined by a time interval between the application of the firing pulse and the application of the erase pulse.

Figure 2:
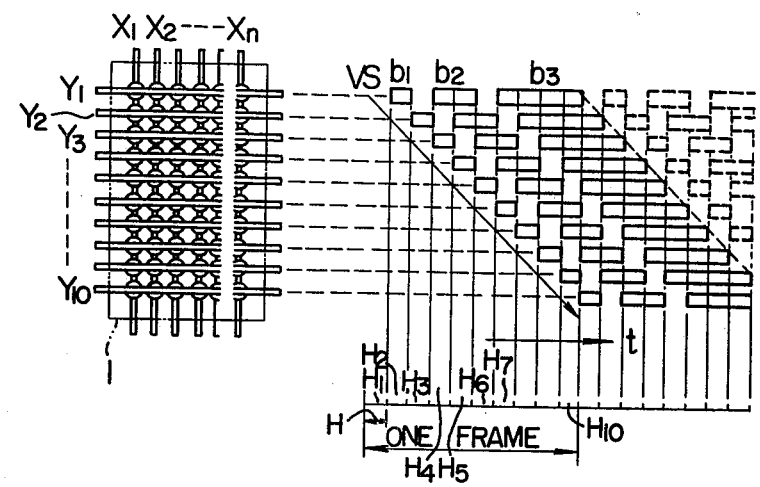
FIG. 2 is a view for explaining the principle of a display with gray-scale luminance.

Referring to FIG. 2 illustrated for explaining the principle of providing a display with gray-scale luminance to a memory type display panel in time-division fashion, a timing chart for a lighting period control is shown. The control scheme will be explained in conjunction with the driver system of FIG. 1. For convenience of illustration, ten horizontal scannings constitute one frame and one horizontal scanning period is represented by H.

In FIG. 2, portions of the analog video signal VS in the first, second, . . . and tenth horizontal scanning periods $H_1, H_2, \ldots H_{10}$ are related to the respective luminescent elements on the horizontal electrodes $Y_1, Y_2, \ldots Y_{10}$.

The analog video signal VS in the first scanning period $H_1$ related to the luminescent elements on the horizontal electrode $Y_1$ is converted to a 3-bit ($b_1, b_2, b_3$) coded video signal. The first bit $b_1$ of the coded video signal is not delayed in the delay circuit 3. Thus, it is then applied to the series-parallel conversion circuit 4 during the first scanning period $H_1$ and read out as n parallel outputs therefrom during the second scanning period $H_2$. At the same time, these n parallel outputs are applied to the X multiplexer 5 to switch signals from the X sustain and firing signal generator circuit 6 to the X multiplexer 5 so that the multiplexer 5 produces n writing or firing signal waveform outputs. Thus, the n luminescent elements on the horizontal electrode $Y_1$ start to emit light corresponding to the first bit $b_1$ in the period $H_2$. The second bit $b_2$ of the coded video signal is delayed in the delay circuit 3 by the time of $2H = H_1 + H_2$, then applied to the series-parallel conversion circuit 4 during the third scanning period $H_3$ and read out as n parallel outputs therefrom during the fourth scanning period $H_4$. At the same time, these parallel outputs are applied to the X multiplexer 5 to produce the switched writing signal waveform outputs therefrom. Thus, the luminescent elements on the horizontal electrode $Y_1$ start to emit light corresponding the second bit $b_2$ in the period $H_4$. This lighting continues during the periods $H_4$ to $H_5$. The third bit $b_3$ of the coded video signal is delayed in the delay circuit 3 by the time of $5H = H_1 + \ldots + H_5$, then applied to the series-parallel conversion circuit 4 during the sixth scanning period $H_6$ and read out as n parallel outputs therefrom during the seventh scanning period $H_7$. At the same time, these parallel outputs are applied to the X multiplexer 5 to produce the switched writing signal waveform outputs therefrom. Thus, the luminescent elements on the horizontal electrode $Y_1$ start to emit light corresponding to the third bit $b_3$ in the period $H_7$. This lighting continues during the periods $H_7$ to $H_{10}$.

The luminescent elements on the horizontal electrode $Y_2$ are subjected to the same scanning as those on the electrode $Y_1$ but in timing relation delayed by 1H. The luminescent elements on the electrode $Y_3$ are subjected to the same scanning as those on the electrical $Y_2$ but in timing relation delayed by 1H. The same holds for the luminescent elements on the electrodes $Y_3, Y_4, \ldots Y_{10}$.

Figure 3:
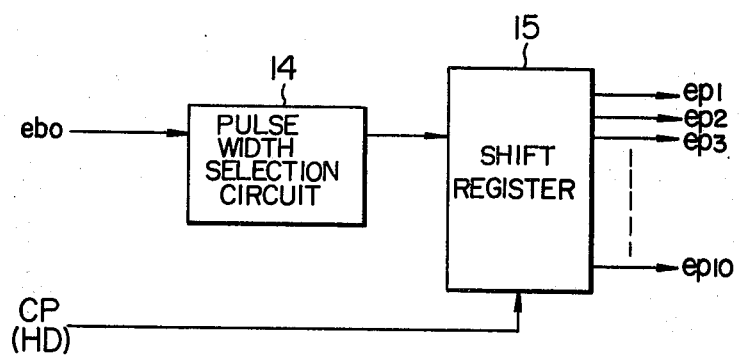
FIG. 3 shows the prior art arrangement of the erase signal generator circuit shown in FIG. 1.
Figure 4:
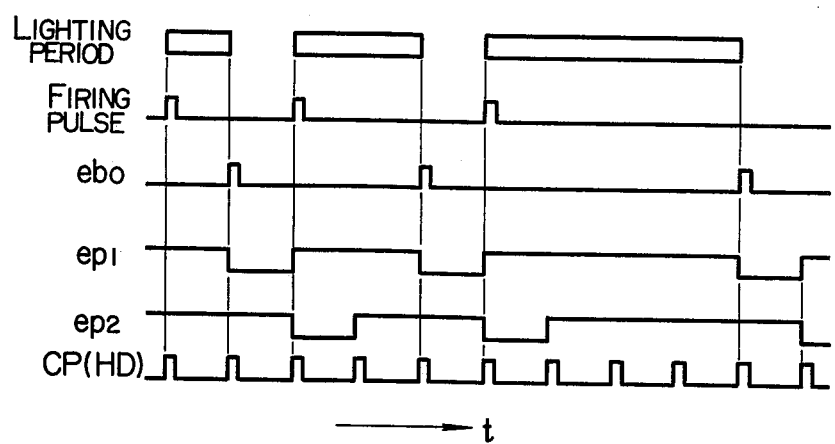
FIG. 4 shows a timing chart of input and output signals in the cirucit of FIG. 3.

The above-described construction and operation principle of the driver system provides an efficient display with gray-scale luminance to the memory type display panel but cannot provide a luminance control. Namely, the prior art arrangement of the erase signal generator circuit 9 shown in FIG. 1 was constructed only by a pulse width selection circuit 14 which determines the pulse width of an erase signal for surely rendering the luminescent element nonlighting in dependence upon the characteristic thereof and a shift register 15 which provides erase signals $e_{p1}-e_{p10}$ timed corresponding to the horizontal electrodes $Y_1-Y_{10}$ respectively, as shown in FIG. 3. On the other hand, input signals to the erase signal generator circuit 9 were the erase timing signal $eb_0$ obtained by a logical OR combination of signals $eb_1$, $eb_2$ and $eb_3$ providing timing bases for erase pulses and the horizontal sync signal HD as the clock pulse CP for driving the shift register 15. The timing relation between these input signals and the erase signal ep from the erase signal generator circuit 9 is shown in FIG. 4. As is apparent from the figure, the rising and falling time instants of erase signals $e_{p1}-e_{p10}$ corresponding to the respective horizontal electrodes are completely timed in synchronism with the pulses HD or CP, thereby providing no function of controlling the widths of the lighting periods.

The present inventor has made an improvement on the erase signal generator circuit 9 in the driver system shown in FIG. 1 so as to increase or decrease the lighting period widths for the respective bits in correlation with each other or in proper ratios so that a luminance control is enabled without reducing the number of gray-scales which can be displayed.

Figure 5:
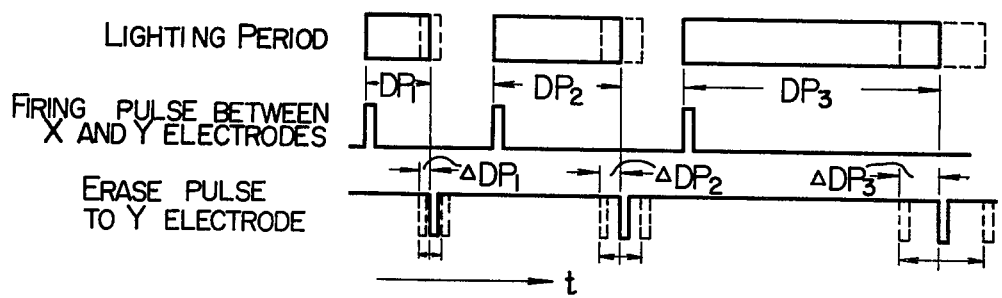
FIG. 5 is a view for explaining the principle of a luminance control according to the present invention.

FIG. 5 illustrates the principle of a luminance control according to the present invention. $DP_1$, $DP_2$ and $DP_3$ represent the lighting periods corresponding to the first, second and third bits of a coded video signal respectively. If the rising time instants of erase pulses are advanced or delayed by $\Delta DP_1$, $\Delta DP_2$ and $\Delta DP_3$ respectively, the variation in luminance is $L_o(\Delta DP_1 + \Delta DP_2 + \Delta DP_3)$, $L_o$ being luminance per unit time. If the widths of variation of the rising time instants for the respective erase pulses are selected to be $\Delta DP_1 = K \cdot DP_1$, $\Delta DP_2 = K \cdot DP_2$ and $\Delta DP_3 = K \cdot DP_3$ (K: constant) respectively, the luminances for respective bits are in constant or fixed ratios.

The same result can be attained by keeping the rising time instants of erase pulses fixed while changing the rising time instants of firing pulses.

Now, preferred embodiments of the present invention will be explained.

EMBODIMENT I

FIG. 6 shows a first embodiment of the present invention in conjunction with a luminance control circuit arrangement which can be used in place of the erase signal generator circuit 9 of the memory type display panel driver system shown in FIG. 1 and belongs to the present invention. A timing chart of various signals in the circuit of FIG. 6 is illustrated in FIG. 7.

Referring to FIG. 6, the luminance control circuit comprises a pulse width modulation circuit 16 which receives signals $eb_1$, $eb_2$ and $eb_3$ providing timing bases for erase pulses generated from the timing pulse generator circuit 13 (see FIG. 1) and produces erase timing signals $eb_1'$, $eb_2'$ and $eb_3'$ having their pulse widths corresponding or proportional to the widths of the respective lighting periods $DP_1$, $DP_2$ and $DP_3$, an integration circuit 17 for converting the erase timing signals $eb_1'$, $eb_2'$ and $eb_3'$ to triangular waveforms respectively, a bias source circuit 18 for supplying a DC bias voltage $V_B$ to the triangular waveforms, a Schmitt trigger circuit 19 for shaping the biased triangular waveforms into rectangular waveforms, an OR gate circuit 20 for receiving the three rectangular waveforms for the first, second and third bits to produce one erase signal output of rectangular waveform, a flip-flop circuit 21 for synchronizing the timing of the rectangular waveform with the clock pulse CP, the pulse width selection circuit 14 for determining the pulse width of an erase signal, and the shift register 15 for producing erase signals $ep_1$–$ep_{10}$ timed corresponding to the respective horizontal electrodes $Y_1$–$Y_{10}$.

In the shown circuit arrangement, the integration circuit 17 uses an RC integration circuit which includes resistors $R_1$, $R_2$, $R_3$ capacitors $C_1$, $C_2$, $C_3$ connected thereto. The pulse width selection circuit 14 uses a differentiation circuit which includes a capacitor Cd and a resistor Rd. Since the construction of the other circuits is well known in the art, further explanation is omitted.

The operation of the circuit shown in FIG. 6 will now be explained referring to FIG. 7.

Assuming that in a standard condition the lighting periods $DP_1$, $DP_2$ and $DP_3$ have their duration times 1H, 2H and 4H, erase pulses are applied after the times 1H, 2H and 4H from the application of respective firing pulses. It will be understood that if the positions of the erase pulses are advanced or delayed a display luminance can be changed.

The erase timing signals $eb_1'$, $eb_2'$ and $eb_3'$ are approximately centered at the respective positions of erase pulses for first, second and third bits in the above-mentioned standard condition. Since these signals are applied to the RC integration circuit 17, waveforms on inputs of the Schmitt triggers 19-1, 19-2 and 19-3 have charging and discharging shapes. The bias source circuit 18 connected to the capacitors $C_1$, $C_2$ and $C_3$ provides the DC bias voltage $V_B$ to the charging and discharging waveforms. If the bias voltage $V_B$ is changed, the time varies for which each charging and discharging waveform starts to rise and reaches the level of a threshold voltage $V_{TH}$ of the associated Schmitt trigger circuit. This time is shortened as $V_B$ is increased or becomes near to $V_{TH}$ and elongated as $V_B$ is decreased or becomes far from $V_{TH}$. The rate of variation in this time is proportional to the gradient or inclination of the charging and discharging waveform. Therefore, if the time constants $C_1R_1$, $C_2R_2$ and $C_3R_3$ are selected in ratios of 1:2:4, the rates of time variation corresponding to the first, second and third bits are approximately in ratios of 1:2:4. Thus, the leading edges of waveform-shaped signals from the Schmitt triggers 19-1, 19-2 and 19-3 correspond to the respective positions of erase signals.

The respective bit signals shaped by the Schmitt trigger circuit 19 are OR-ed in the OR gate circuit 20 to produce one signal. The signal from the OR gate circuit 20 is synchronized with the clock pulse signal CP in the flip-flop circuit 21. Thus, erase pulses may be moved by desired amount whose unit is a pulse interval or period of the clock pulse signal CP which is $\frac{1}{3}$ of 1H in the example of FIG. 7.

The output pulses from the flip-flop circuit 21 are differentiated by Cd and Rd in the pulse width selection circuit 14 to extract the leading edges of those pulses, and the differentiated outputs are applied to the shift register 15. Thus, the shift register 15 generates erase signals $ep_1$–$ep_{10}$ to be related to the horizontal electrodes $Y_1$–$Y_{10}$ respectively. Since the timing of each erase signal ep should be shifted between adjacent Y electrodes by 1H, a 3-bit delay capacity is necessary between adjacent outputs of the shift register 15 because the period of the clock pulse signal CP is $\frac{1}{3}$ H. If the period of the clock pulse signal CP is selected to be 1/m H (m: positive integer), an m-bit delay capacity is necessary per one Y electrode. When m is large, a finer luminance adjustment can be attained but the storage capacity for the shift register 15 is increased.

In the shown example, the charging and discharging waveform is produced by the elements R and C of the integration circuit 17. However, the use of three constant current elements instead of the elements R can provide more accurate ratios of time variation rates. In that case, the output currents of the three constant current elements are selected in ratios of 1:2:4. The constant current element may be a constant current diode or an emitter follower connected transistor.

In the case where the differentiation circuit of Cd and Rd used as the pulse width selection circuit 14 is replaced by a mono-stable multivibrator which generates pulses narrower than the period of the clock pulse signal CP, the operation can be further stabilized.

By changing the bias voltage $V_B$ of the bias source circuit 18 as described above, the display luminance of the memory type display panel can be controlled or changed without deteriorating the gray-scale characteristic.

EMBODIMENT II

Figure 8:
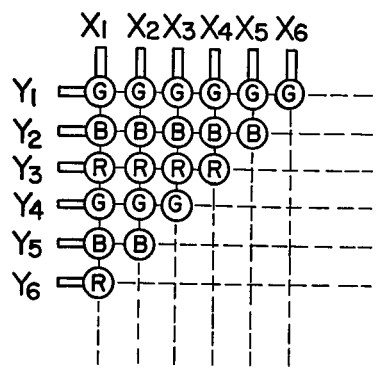
FIG. 8 shows an array of color luminescent elements in a display panel used in a second embodiment of the present invention applied to a color display.

The principle of the present invention is applicable to a color display as a second embodiment. A control for white balance of color picture image can be effected by using three circuits each identical to the circuit of FIG. 6 when luminescent elements for each color in a memory type color display panel are arranged in transversal sequence as shown in FIG. 8.

Figure 9:
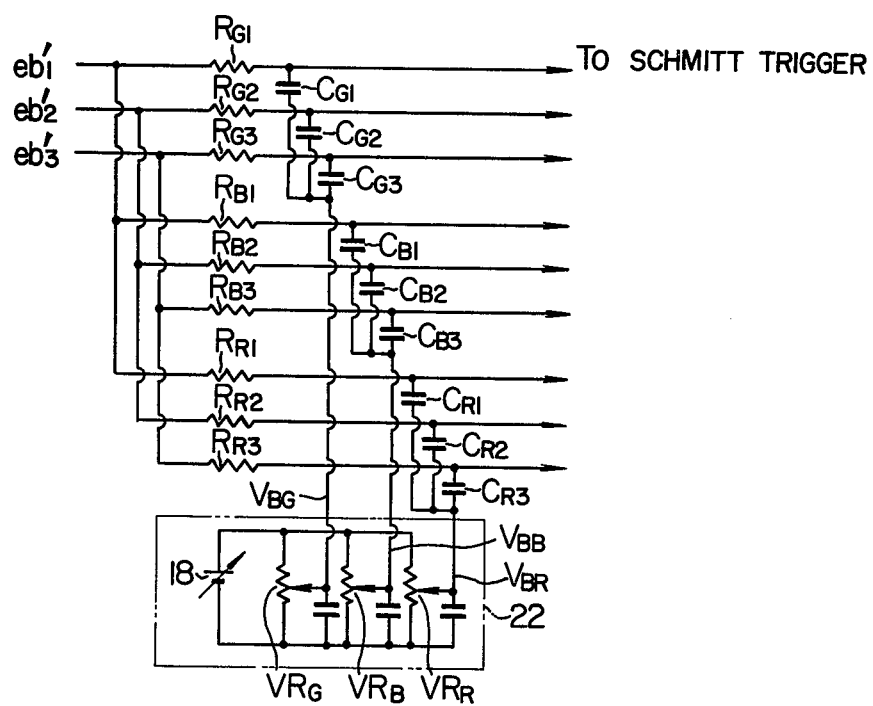
FIG. 9 shows an arrangement of a main part of a circuit for realizing the second embodiment.

The second embodiment of the present invention comprises three circuit arrangements which respectively correspond to Y electrodes including the associated green, blue and red luminescent elements G, B and R and each of which includes the integration circuit 17, Schmitt trigger circuit 19, OR gate circuit 20, flip-flop circuit 21, pulse width selection circuit 14 and shift register 15 of FIG. 6. For convenience of illustration, however, FIG. 9 shows only the integration circuit portion associated with a biasing circuit 22. The biasing circuit 22 includes the bias source circuit 18, potentiometers $VR_G$, $VR_B$ and $VR_R$ associated with luminescent elements G, B and R respectively, and bypass capacitors as inserted if necessary for preventing the variation of bias voltages due to erase timing signal. The bias voltages $V_{BG}$, $V_{BB}$ and $V_{BR}$ are individually changed by the potentiometers $VR_G$, $VR_B$ and $VR_R$ so that the luminances of the elements G, B and R vary independently. Thus, the luminances of G, B and R can be provided in any selected ratios. Namely, a control for white balance of display image is possible.

When the bias voltages are changed by the bias source circuit 18, the bias voltages $V_{BG}$, $V_{BB}$ and $V_{BR}$ for G, B and R vary in constant ratios so that a luminance control for color picture image can be effected without giving any influence on the white balance.

As mentioned above, the luminance control circuit according to the present invention enables a display luminance control and a white balance control in the case of color display without deteriorating the gray-scale luminance characteristic, thereby providing means which is remarkably effective for a gray-scale display in a memory type display panel.

The present invention has been described and illustrated in conjunction with the specified embodiments. But, it should be noted that various modifications and changes may be made. For example, though explanation has been made with respect to 3-bit coded video signal, it is needless to say that coding levels of more than 3 may be employed. Though the embodiments have been described with respect to the case where the increase or decrease in the lighting period width is effected by shifting the timing of erase pulse, the same result may be attained by shifting the timing of firing pulse while keeping the timing of erase pulse unchanged.

What is claimed is:

1. In a driver system of a memory type display panel including a matrix of luminescent elements each having a bi-stable operation condition of lighting and non-lighting states with the lighting states beginning when a firing pulse is applied to the luminescent elements and continuing until an erase pulse is applied to the luminescent elements, in which a gray-scale luminance is provided to the display panel by the combination of a plurality of divided lighting periods, the lighting periods being provided in the lighting states of the luminescent elements, the improvement comprising circuit means for increasing or decreasing the respective widths of the divided lighting periods in correlation with each other to control the gray-scale luminance of the display panel.

2. A driver system according to claim 1, wherein said circuit means includes a first circuit for receiving a plurality of input signals for control of the respective widths of said divided lighting periods to produce a plurality of pulse width modulated signals having their pulse widths corresponding to the respective widths of said divided lighting periods, a second circuit for converting said pulse width modulated signals to triangular waveforms respectively, a third circuit for supplying a bias voltage to said triangular waveforms, fourth circuit for shaping the biased triangular waveforms into rectangular waveforms respectively, a fifth circuit for receiving said rectangular waveforms from said fourth circuit to produce a rectangular waveform signal, a sixth circuit for synchronizing said rectangular waveform signal with predetermined clock pulses, a seventh circuit for receiving an output from said sixth circuit to produce outputs having their predetermined duration times required for erase, and an eighth circuit for providing the outputs of said seventh circuit as erase signals at predetermined time instants.

3. A driver system according to claim 2, wherein said seventh circuit comprises a differentiation circuit which includes a capacitor and a resister.

4. A driver system according to claim 2, wherein said seventh circuit comprises a mono-stable multivibrator.

5. A driver system according to claim 1, further comprising:
means for providing erase timing pulses; and
means for producing erase pulses based on said erase timing pulses including means to advance or delay the erase pulses relative to the erase timing pulses to control the width of the divided lighting periods.

6. A driver system according to claim 5, wherein said means to advance or delay the erase pulses includes pulse width modulation means which receives the erase timing pulses and produces pulse width modulated signals having their pulse widths corresponding to the respective widths of the divided lighting period.

7. A driver system according to claim 6, further comprising means coupled to the output of said pulse width modulation means for producing a triangular waveform whose rise time is determined by the pulse width of the output pulses of said pulse width modulation means.

8. A driver system according to claim 7, further comprising threshold means coupled to the output of the triangular waveform producing means for producing an output pulse having a pulse width determined by the period of time which the triangular waveform exceeds a predetermined threshold.

9. A driver system according to claim 8, further comprising pulse width selection means coupled to the output of the threshold means for producing a pulse having a pulse width narrower than the pulse width of the output pulse of the threshold means to indicate the leading edge of the output pulse of the threshold means, and means for producing the erase pulse upon generation of the output pulse of the pulse width selection means.

10. A driver system according to claim 7, wherein the triangular waveform producing means is an integrator.

11. A driver system according to claim 8, wherein the threshold means is a Schmitt trigger.

12. A driver system according to claim 9, wherein the pulse width selection means is a differentiation circuit.

13. A driver system according to claim 9, wherein the pulse width selection means is a monostable multivibrator.

* * * * *